United States Patent
Park et al.

(10) Patent No.: US 9,634,588 B2
(45) Date of Patent: Apr. 25, 2017

(54) DEVICE AND METHOD OF 6-STEP CONTROLLING INVERTER OF MOTOR DRIVING SYSTEM

(71) Applicants: Hyundai Motor Company, Seoul (KR); Kia Motors Corporation, Seoul (KR)

(72) Inventors: Hong Geuk Park, Chungcheongnam-Do (KR); Mu Shin Kwak, Gyeonggi-Do (KR); Sung Kyu Kim, Gyeonggi-Do (KR); Su Hyun Bae, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 61 days.

(21) Appl. No.: 14/566,583

(22) Filed: Dec. 10, 2014

(65) Prior Publication Data

US 2016/0006381 A1 Jan. 7, 2016

(30) Foreign Application Priority Data

Jul. 4, 2014 (KR) ........................ 10-2014-0083481

(51) Int. Cl.
*H02P 21/00* (2016.01)
*H02P 6/14* (2016.01)
*H02P 27/08* (2006.01)
*H02M 7/5387* (2007.01)
*H02M 7/5395* (2006.01)
*H02P 21/10* (2016.01)

(52) U.S. Cl.
CPC ............ *H02P 6/14* (2013.01); *H02M 7/5395* (2013.01); *H02M 7/53873* (2013.01); *H02P 21/10* (2013.01); *H02P 27/085* (2013.01)

(58) Field of Classification Search
CPC ...... H02P 21/06; H02P 21/0003; H02P 27/08; H02P 21/0089; H02P 21/14; H02P 6/08; H02P 6/10; H02P 21/02; H02P 2203/09; H02P 2205/05; H02P 2207/05; H02P 2209/01; H02P 25/08; H02P 27/06; H02P 6/18
USPC .......... 318/400.02, 400.09, 400.23, 432, 722
See application file for complete search history.

(56) References Cited

U.S. PATENT DOCUMENTS

| 6,043,995 | A | 3/2000 | Leuthen | |
| 6,388,419 | B1 * | 5/2002 | Chen | B60L 11/14 318/727 |
| 6,674,262 | B2 * | 1/2004 | Kitajima | H02P 6/10 318/722 |

(Continued)

FOREIGN PATENT DOCUMENTS

| EP | 2159909 A1 | 3/2010 |
| EP | 2164156 A1 | 3/2010 |

(Continued)

*Primary Examiner* — Paul Ip
(74) *Attorney, Agent, or Firm* — Mintz Levin Cohn Ferris Glovsky and Popeo, P.C.; Peter F. Corless

(57) ABSTRACT

A device and a method of 6-step controlling of an inverter of a motor driving system are provided. The device and method and apply a voltage to a motor by adopting a 6-step control scheme capable of maximally using an input voltage of the inverter to improve output efficiency of the inverter and the motor and thus improve fuel efficiency of an environmentally friendly vehicle.

8 Claims, 4 Drawing Sheets

(56) References Cited

U.S. PATENT DOCUMENTS

| | | | |
|---|---|---|---|
| 7,336,050 B2* | 2/2008 | Ihm | H02P 21/06 318/432 |
| 7,772,790 B2* | 8/2010 | Nashiki | H02K 1/145 318/400.02 |
| 8,040,096 B2* | 10/2011 | Taniguchi | H02M 1/32 318/490 |
| 8,115,431 B2* | 2/2012 | Hashimoto | H02P 27/08 318/400.02 |
| 8,237,392 B2* | 8/2012 | Ueda | B62D 5/046 318/599 |
| 8,310,186 B2* | 11/2012 | Imura | H02P 21/0003 318/400.01 |
| 2002/0097015 A1* | 7/2002 | Kitajima | H02P 6/10 318/432 |
| 2005/0029982 A1 | 2/2005 | Stancu et al. | |
| 2005/0140329 A1* | 6/2005 | Ihm | H02P 21/06 318/712 |
| 2006/0132074 A1 | 6/2006 | Yang et al. | |
| 2008/0129243 A1* | 6/2008 | Nashiki | H02K 1/145 318/701 |
| 2009/0096394 A1* | 4/2009 | Taniguchi | H02M 1/32 318/400.09 |
| 2009/0167224 A1* | 7/2009 | Miura | B62D 5/046 318/400.23 |
| 2009/0240389 A1* | 9/2009 | Nomura | B62D 5/046 701/31.4 |
| 2010/0045217 A1* | 2/2010 | Ueda | B62D 5/046 318/400.02 |
| 2010/0060211 A1* | 3/2010 | Hashimoto | H02P 27/08 318/400.02 |
| 2010/0127656 A1 | 5/2010 | Ohtani et al. | |
| 2011/0006711 A1* | 1/2011 | Imura | H02P 6/08 318/400.07 |
| 2011/0022271 A1* | 1/2011 | Ueda | B62D 5/046 701/41 |
| 2011/0043144 A1* | 2/2011 | Ueda | B62D 5/046 318/400.02 |
| 2011/0050137 A1* | 3/2011 | Imura | H02P 21/0003 318/400.15 |
| 2011/0241578 A1* | 10/2011 | Kim | H02P 21/14 318/400.02 |
| 2013/0141023 A1* | 6/2013 | Sugita | H02P 21/0003 318/400.02 |
| 2013/0147417 A1* | 6/2013 | Kim | H02P 21/0003 318/722 |
| 2013/0175960 A1* | 7/2013 | Gallegos-Lopez | H02P 21/00 318/432 |
| 2013/0328508 A1* | 12/2013 | Bae | H02P 21/0085 318/400.02 |

FOREIGN PATENT DOCUMENTS

| | | |
|---|---|---|
| EP | 2290805 A1 | 3/2011 |
| JP | 2002-034289 A | 1/2002 |
| JP | 2008-312420 A | 12/2008 |
| JP | 2013-038922 A | 2/2013 |
| KR | 10-2004-0099843 A | 12/2004 |
| KR | 10-2008-0066986 A | 7/2008 |
| KR | 10-1304665 B1 | 9/2013 |

\* cited by examiner

DEVICE AND METHOD OF 6-STEP CONTROLLING INVERTER OF MOTOR DRIVING SYSTEM

CROSS-REFERENCE TO RELATED APPLICATION

This application claims under 35 U.S.C. §119(a) the benefit of Korean Patent Application No. 10-2014-0083481 filed on Jul. 4, 2014, the entire contents of which are incorporated herein by reference.

BACKGROUND (a) Technical Field

The present disclosure relates to a device and a method of 6-step controlling an inverter of a motor driving system. More particularly, it relates to a device and a method of a 6-step control of an inverter of a motor driving system, which applies a voltage to a motor by applying a 6-step control scheme that uses an input voltage of an inverter to improve output efficiency of the inverter and the motor.

(b) Background Art

In general, a motor driving system for driving a motor includes, as illustrated in FIG. 1, a power supply device for an inverter or a battery 100, configured to supply a direct current voltage to the inverter, a main relay 102 switched for application of the direct current voltage to the inverter 200, the inverter 200 configured to receive the direct current (DC) voltage when the main relay 102 is operated, and convert the received direct current voltage to an alternating current (AC) voltage, and a motor 300 (e.g., three-phase alternating current motor) driven by the alternating current voltage applied from the inverter.

The inverter is configured to generate the direct current voltage input from the power supply device for the inverter or the battery into the alternating current voltage by on-off controlling a switching device (e.g., turning the switching device on and off) through pulse width modulation (PWM), and supply the generated alternating current voltage to the motor for driving the motor. In particular, when the alternating current voltage is supplied from the inverter to the motor in 6-steps by an operation of the inverter, it may be possible to reduce a current consumed by the motor under the same output condition. The supply of the voltage to the motor in the 6-steps may improve efficiency of a system of an environmentally-friendly vehicle, such as an electric vehicle, a hybrid vehicle, and a fuel cell vehicle, in which the motor is mounted, and provide a fuel efficiency improvement effect, as well as improve output and efficiency of the inverter and the motor.

A developed related art discloses a control device and a control method for a motor driving system that include a control configuration switched between a pulse width modulation (PWM) control mode and a rectangular wave voltage control mode. Another related art discloses an AC motor driving controller that includes an overmodulation PWM controller configured to calculate a d-axis voltage instruction and a q-axis voltage instruction in which a voltage amplitude exceeds a peak value of a triangular waveform carrier. The above described related art are technologies for estimating a torque using values detected by a current sensor and a position sensor and motor currents (Id, Iq), and using the estimated torque for controlling feedback of the torque, but have disadvantages described below.

First, since it may not be possible to use a current control loop when the 6-step control is applied, a mode switch (e.g., overmodulation control⇔6-step phase control) technique having no discontinuity is additionally required, and a voltage vector phase calculator configured to estimate a torque is required to be additionally developed.

Second, since the related art uses a closed-loop torque control scheme through estimation of a torque, a high accuracy torque estimator with a satisfied level is additionally required, and a high accuracy loss map is required to estimate a torque using a phase voltage and a phase current.

The above information disclosed in this section is merely for enhancement of understanding of the background of the invention and therefore it may contain information that does not form the prior art that is already known in this country to a person of ordinary skill in the art.

SUMMARY

The present invention provides a device and a method of 6-step controlling an inverter of a motor driving system, which apply a 6-step control scheme using an input voltage of an inverter and using a voltage use rate applied to a motor to improve output and efficiency of the inverter and the motor, and improve fuel efficiency of an environmentally-friendly vehicle.

In one aspect, the present invention provides a device for 6-step controlling an inverter of a motor driving system that may include: a current command map configured to generate a d/q axis current command; a current controller configured to generate a voltage command using a difference component between a d/q axis current requested by the current command map and a d/q axis current actually measured by a current sensor; and an inverter 6-step controller configured to detect a voltage vector phase from a voltage command output from the current controller, generate a switching frequency for 12-sample phase controlling using the detected voltage vector phase component, and apply a voltage command that corresponds to each of vertexes of a hexagon of a voltage vector diagram corresponding to a maximum voltage use rate to an inverter using the generated frequencies.

In an exemplary embodiment, the inverter 6-step controller may include: a frequency updating unit including a 12-sample phase control switching frequency calculating unit configured to calculate a switching frequency component for the 12-sample phase control using the voltage vector phase obtained through a voltage vector phase detection unit; and a current control task unit including a voltage vector phase detecting unit, configured to detect a voltage vector phase using a voltage command output from the current controller and provide the 12-sample phase control switching frequency calculating unit with the detected voltage vector phase, and a high gain over voltage modulation (HOVM) controller configured to generate a high gain over voltage modulated output voltage by multiplying an output voltage of the current controller by a gain, generate the high gain over voltage modulated output voltage by 12 times per one period of a fundamental wave based on the switching frequencies for the 12-sample phase control, change a pulse width modulation (PWM) period to cause voltage vectors to be substantially symmetric based on the vertexes to converge the actual voltage vector to the vertex of the hexagon of the voltage vector diagram, and adjust a voltage vector phase, and apply a voltage command that corresponds to the vertex of the hexagon of the voltage vector diagram to the inverter through minimum distance overmodulation control.

In another exemplary embodiment, the frequency updating unit may further include a switching frequency switching unit configured to switch one of the switching frequencies for the 12-sample phase control calculated by the 12-sample phase control switching frequency calculating unit or predetermined switching frequencies to an updated frequency signal, and transmit the updated frequency signal to the current control task unit.

Further, the present invention provides a method of 6-step controlling an inverter of a motor driving system that may include: generating a voltage command using a difference component between a d/q axis current requested by a current command map and an actually measured d/q axis current; and 6-step controlling of an inverter by detecting a voltage vector phase from the voltage command, generating switching frequencies for 12-sample phase control using the detected voltage vector phase component, and applying a voltage command that corresponds to each of vertexes of a hexagon of a voltage vector diagram corresponding to a maximum voltage use rate using the generated frequencies to the inverter.

In still another aspect, the present invention provides a method of 6-step controlling an inverter of a motor driving system that may include: detecting a voltage vector phase from a specific voltage command; and 6-step controlling of an inverter by generating switching frequencies for 12-sample phase control using the detected voltage vector phase component, and applying a voltage command corresponding to each of vertexes of a hexagon of a voltage vector diagram that corresponds to a maximum voltage use rate using the generated frequencies to the inverter.

In an exemplary embodiment, the 6-step controlling of the inverter may include, when the voltage command corresponding to each of the vertexes of the hexagon of the voltage vector diagram is applied to the inverter, generating a high gain over voltage modulated output voltage by multiplying an output voltage of a current controller by a gain, generating the high gain over voltage modulated output voltage by 12 times per one period of a fundamental wave based on the switching frequencies for the 12-sample phase control, changing a pulse width modulation (PWM) period to cause voltage vectors to be symmetric based on the vertexes to converge the actual voltage vector to the vertex of the hexagon of the voltage vector diagram, and adjusting a voltage vector phase, and applying a voltage command that corresponds to the vertex of the hexagon of the voltage vector diagram to the inverter through minimum distance overmodulation control.

In another exemplary embodiment, the minimum distance overmodulation control may be performed to cause the voltage applied to the inverter to generate a waveform with the 6 steps to a square wave, and may include a process of calculating a virtual vector value obtained by multiplying a voltage vector that corresponds to an inscribed circle of the hexagon of the voltage vector diagram indicating 100% of an inverter voltage use rate by a constant, and a process of virtually drawing a vertical line converged to the vertex of the hexagon indicating 110% or greater of the inverter voltage use rate from the virtual vector value.

In still another exemplary embodiment, the 6-step controlling of the inverter may further include generating the switching frequencies for the 12-sample phase control, and determining whether to perform the 6-step control of the inverter based on whether the switching frequencies meet a 12-sample phase control condition.

In addition, the 12-sample phase control condition may be set based on a speed and a torque of a motor, and an input voltage of the inverter. When the 12-sample phase control condition is not satisfied, a PWM signal, which is a final output voltage signal for the inverter, may be synchronized to a predetermined switching frequency to be used for the control of the inverter. When the 12-sample phase control condition is satisfied, a PWM signal, which is a final output voltage signal for the inverter, may be synchronized to the switching frequencies for the 12-sample phase control to be used for the control of the inverter.

According to the present invention, a 6-step voltage may be applied to a driving motor by the inverter 6-step control scheme, to maximally use a voltage use rate applicable to the driving motor, improve output and efficiency of the motor, and improve fuel efficiency of an environmentally-friendly vehicle.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
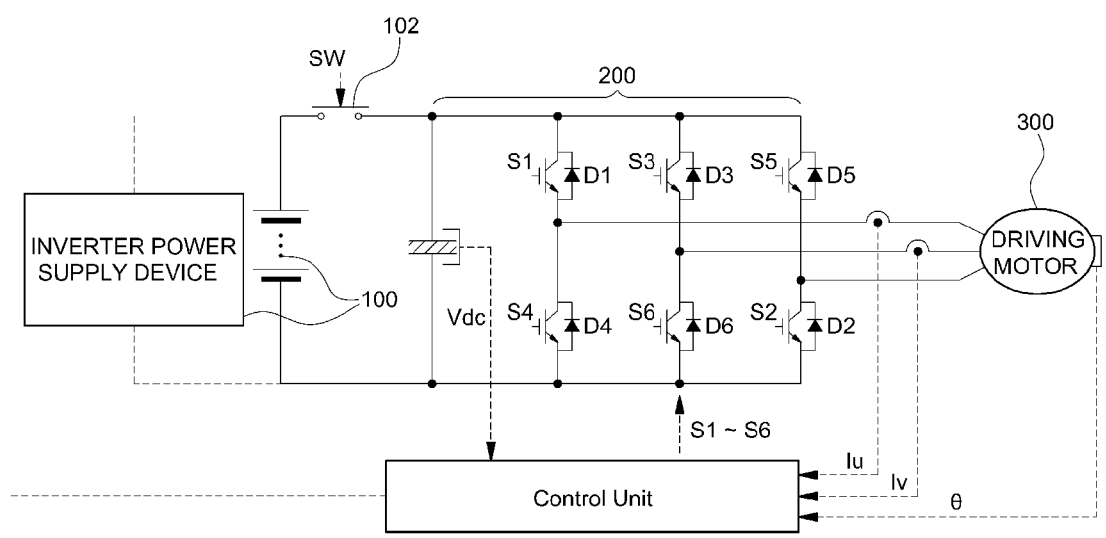
FIG. 1 is an exemplary block diagram illustrating a configuration of a motor driving system according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g.

fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Hereinafter, an exemplary embodiment of the present invention will be described in detail with reference to the accompanying drawings. The present invention focuses a 6-step control scheme capable of maximally using an input voltage of an inverter and may be applied to an inverter control process to maximally use a voltage use rate applied to a motor, in consideration of a fact that when an alternating current voltage is supplied from an inverter to a motor in 6 steps by an operation of the inverter, it may be possible to reduce a current consumed by the motor under the same output condition.

Figure 2:
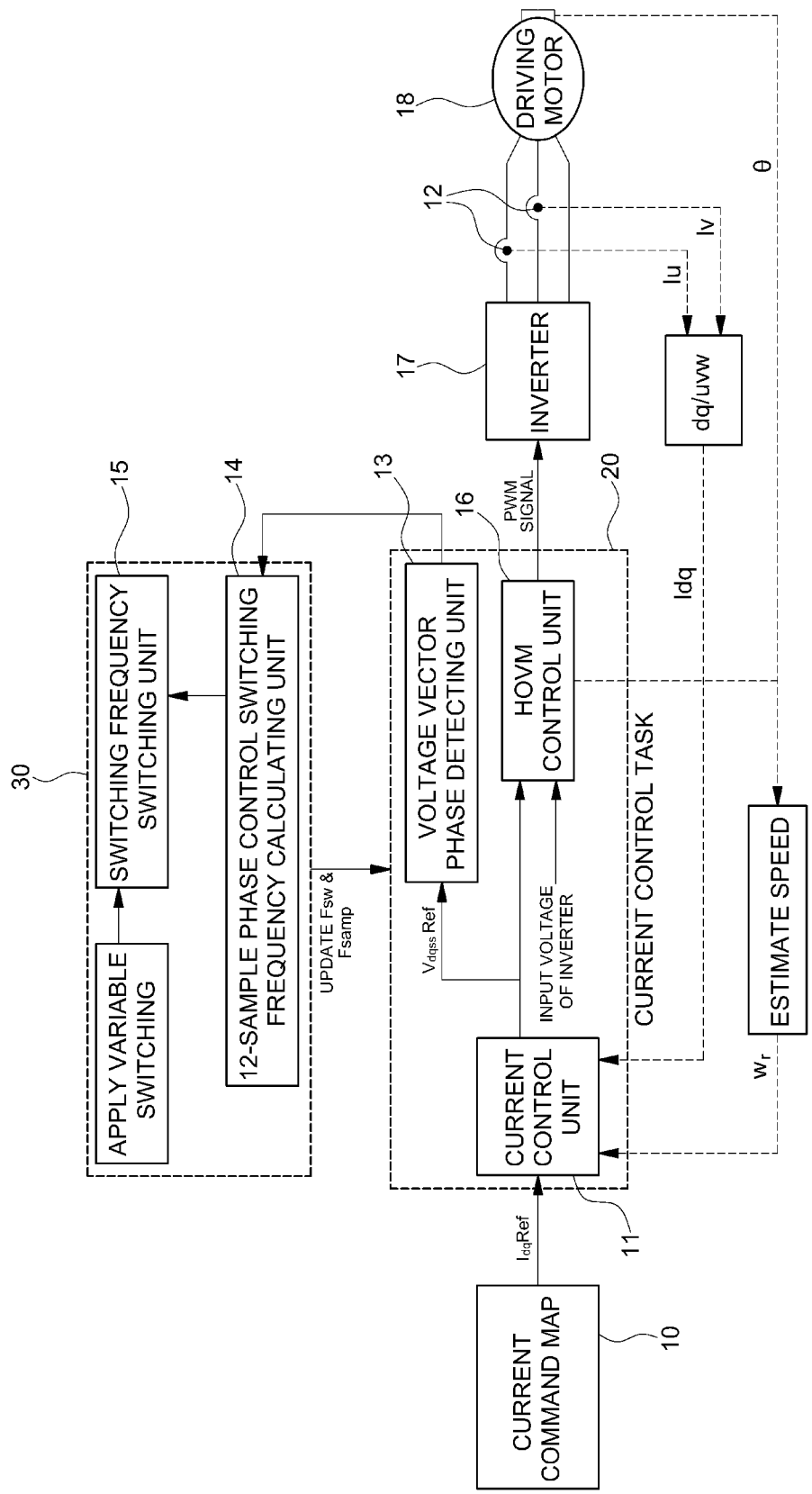
FIG. 2 is an exemplary control block diagram illustrating a device for 6-step controlling an inverter of a motor driving system according to an exemplary embodiment of the present invention.
Figure 3:
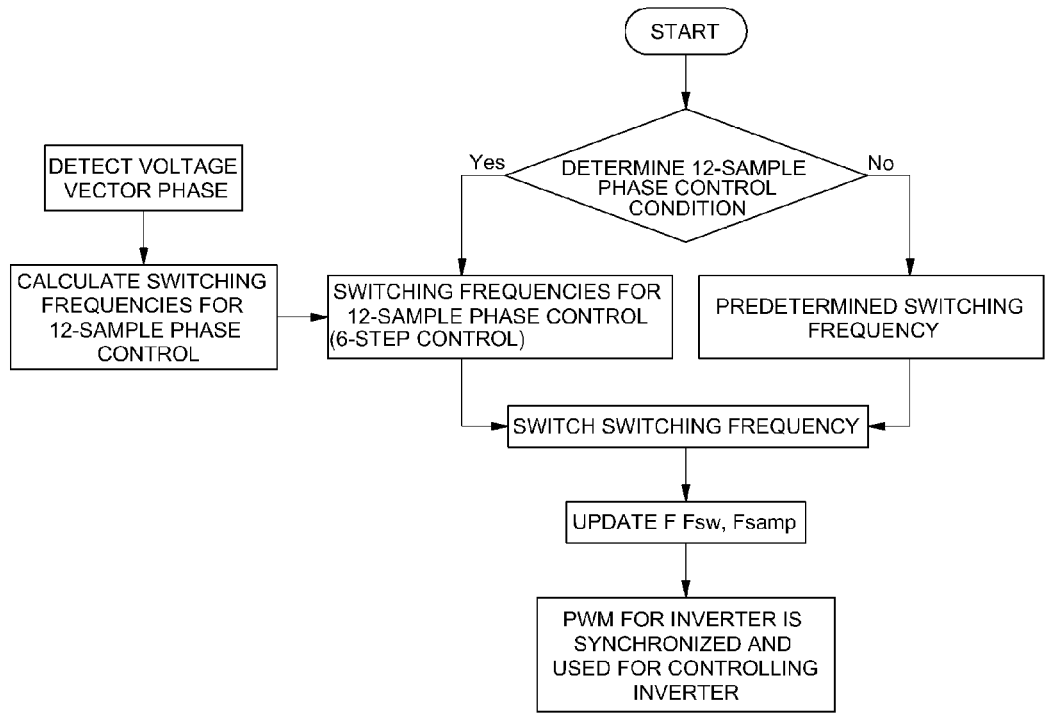
FIG. 3 is an exemplary flowchart illustrating a method of 6-step controlling an inverter of a motor driving system according to an exemplary embodiment of the present invention.

FIG. 2 is an exemplary control block diagram illustrating a device for 6-step controlling an inverter of a motor driving system according to the present invention, and FIG. 3 is an exemplary flowchart illustrating a method of 6-step controlling an inverter of a motor driving system according to the present invention. As illustrated in FIG. 2, an inverter 6-step controller may include a current command map 10 and a current controller 11 both disposed at an input side of an inverter 17.

The inverter 6-step controller may be configured to detect a voltage vector phase from a voltage command output from the current controller 10 to maximally use a voltage use rate applied to the motor, generate a switching frequency for phase-controlling 12 samples using the detected voltage vector phase component, and then apply a voltage command that corresponds to each of vertexes of a hexagon of a voltage vector diagram corresponding to a maximum voltage use rate to the inverter using the generated frequency to execute a series of inverter 6-step control logic. Accordingly, the inverter 6-step controller may be divided into a frequency updating unit 30 configured to calculate a 12-sample phase control switching frequency and provide a current control task unit 20 with the calculated 12-sample phase control switching frequency, and the current control task unit 20 configured to operate the inverter 17 with the 12-sample phase control switching frequency provided from the frequency updating unit 30.

The frequency updating unit 30 may include a 12-sample phase control switching frequency calculating unit 14 configured to calculate switching frequency components for 12-sample phase control using the voltage vector phase calculated through the voltage vector phase detecting unit 13, and a switching frequency switching unit 15 configured to switch one of the switching frequencies for the 12 sample phase controlling calculated by the 12-sample phase control switching frequency calculating unit 14 or predetermined switching frequencies to an updated frequency signal, and transmit the updated frequency signal to the current control task unit 20.

The current control task unit 30 may include a voltage vector phase detecting unit 13 configured to detect a voltage vector phase using a voltage command output from the current controller 11 and then provide the 12-sample phase control switching frequency calculating unit 14 with the detected voltage vector phase, and a high gain over voltage modulation controller 16 configured to generate an output voltage (VdqssHOVM) high gain over voltage modulated 12 times per one period of a fundamental wave by multiplying an output voltage (VdqssRef) of a current controller output from the frequency updating unit 30 based on the switching frequencies for the 12-sample phase control by a gain, and then apply a voltage command that corresponds to each of the vertexes of the hexagon of the voltage vector diagram to the inverter through minimum distance overmodulation control. In particular, an inverter 6-step control method based on the configuration for the inverter 6-step control will be sequentially described below.

First, the current command map 10 may be configured to generate a d/q axis current command for driving the motor, and input the generated current command into the current controller 11. In particular, a u/v phase current actually measured by the current sensor 12 disposed at an output side of the inverter may be converted to a d/q axis current through coordinate conversion to be input into the current controller 11. Accordingly, the current command map 10 may be configured to generate the voltage command using a different component between the d/q axis current instructed by the current controller 11 and the actually measured d/q axis current, to cause the current command map 10 to generate the voltage command (e.g., stationary coordinate system) using a PI controller within the current controller 11.

Further, the voltage vector phase detecting unit 13 may be configured to detect a voltage vector phase using the voltage command (stationary coordinate system) output from the current controller 11. In particular, even when the current controller is not included, and the present invention may be used in a control scheme of generating and using a specific voltage command (e.g., V/f control and the like), the inverter 6-step control described below may be applied as it is after the detection of the voltage vector phase.

Figure 4:
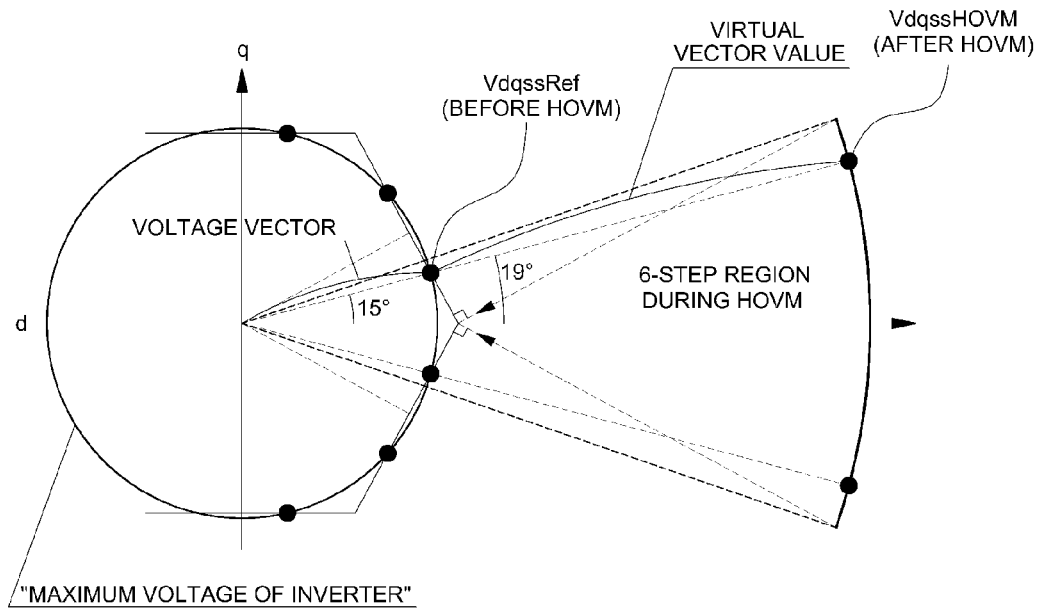
FIG. 4 is an exemplary conceptual diagram illustrating a voltage vector and overmodulation for 6-step controlling the inverter of the motor driving system according to an exemplary embodiment of the present invention.

The 12 sample phase control switching frequency calculating unit 15 may be configured to calculate the switching frequency components for the 12-sample phase control using the voltage vector phase calculated through the voltage vector phase detecting unit 13. In particular, the voltage vector phase detected by the voltage vector phase detecting unit 13 may be expressed by a hexagonal stationary coordinate system as an inverter voltage vector diagram as illustrated in FIG. 4. In the voltage vector diagram of FIG. 4, an inscribed circle of the hexagon represents an inverter maximum voltage, that is, 100% of an inverter voltage use rate.

Figure 5:
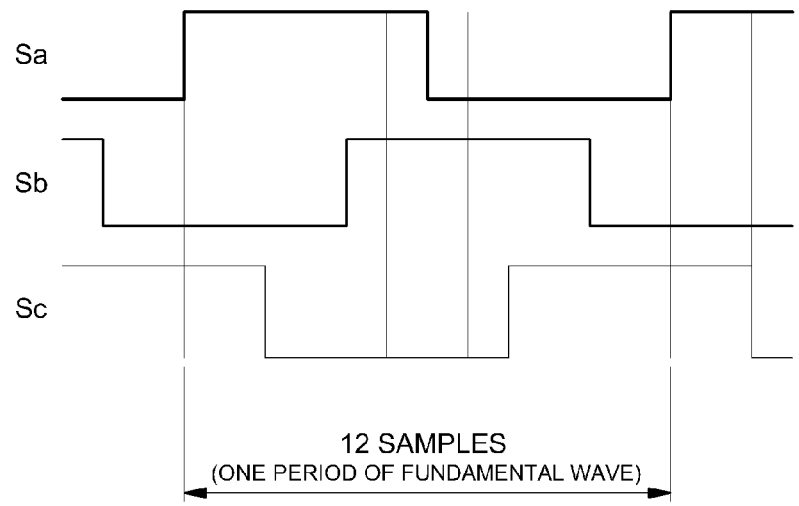
FIG. 5 is an exemplary waveform diagram illustrating electrical angular frequencies of 12 samples for 6-step controlling the inverter of the motor driving system according to an exemplary embodiment of the present invention.

The present invention focuses a fact that it may be possible to decrease a current amount over the output, and thus reduce the amount of battery consumption and promote improvement in fuel efficiency of an environmentally-friendly vehicle by increasing a voltage component entering the motor 18 by 110% or greater and outputting the increased voltage component by improving the inverter voltage use rate by 110% or greater. Accordingly, the 12-sample phase control switching frequency calculating unit 15 may be configured to generate the switching frequencies for the 12-sample phase control using the voltage vector phase component detected by the voltage vector phase detection unit 13, and the generated switching frequencies for the 12-sample phase control may have 12 samples per one period of the fundamental wave for each 3-phase electrical angular frequency as illustrated in FIG. 5, and the 12 samples mean frequency components for the phase control for generating 12 points with a substantially equal interval on respective sides of the hexagon of the voltage vector diagram.

Furthermore, after the switching frequencies for the 12-sample phase control are generated, an operation of determining whether to perform the inverter 6-step control according to satisfaction or dissatisfaction of the 12-sample phase control condition may be performed. In particular, the 12-sample phase control condition may be set based on a speed of the motor, a torque of the motor, and an input voltage of the inverter. When the 12-sample phase control condition is not satisfied, the PWM signal, which is a final output voltage signal for the inverter, may be synchronized to a predetermined switching frequency Fsw to be used for the inverter control.

However, when the 12-sample phase control condition is satisfied, the switching frequency switching unit 16 may be configured to perform variable switching and transmit a switching frequency (Fsamp) for the 12-sample phase control to the current control task unit 20 as an update signal. Accordingly, the PWM signal, which is the final output voltage signal for the inverter, may be synchronized to the 12-sample phase control switching frequencies by the current control task unit 20 to be used for the inverter control. Accordingly, the current control task unit 20 may be configured to perform the substantial inverter 6-step control of applying the voltage command that corresponds to each of the vertexes of the hexagon of the voltage vector diagram corresponding to the maximum voltage use rate to the inverter using the 12-sample phase control switching frequencies from the frequency updating unit 30.

Additionally, to generate an order of the voltage command that corresponds to each of the vertexes of the hexagon in the voltage vector diagram, necessary conditions described below may be required.

(a) To obtain the voltage use rate of about 110% or greater, an output voltage (VdqssHOVM) which is high gain over voltage modulated by 12 times per one period of the fundamental wave by multiplying the output voltage (VdqssRef) of the current controller by a gain may be necessary.

(b) For an actual voltage vector to be converged on the vertexes of the hexagon of the voltage vector diagram, the 12 samples may be maintained at the electrical angular frequency. In particular, the PWM period may be adjusted to cause the 12 samples to be substantially symmetric based on the vertex of the hexagon when maintaining the 12 samples per one period of the fundamental wave.

(c) Minimum distance overmodulation for causing the high gain over voltage modulated output voltage (VdqssHOVM) to be a maximum voltage (the vertex of the hexagon) of about 110% or greater of the voltage use rate actually output by the inverter may be necessary.

A process of performing the substantial inverter 6-step control based on the necessary conditions will be described in more detail below.

When the output voltage VdqssRef of the current controller is output to the HOVM controller 14 based on the 12-sample phase control switching frequencies from the frequency updating unit 30, the HOVM controller 14 may be configured to generate the output voltage (VdqssHOVM) high gain over voltage modulated by 12 times per one period of the fundamental wave by multiplying the output voltage (VdqssRef) of the current controller by a gain, and then apply a voltage command that corresponds to each of the vertexes of the hexagon of the voltage vector diagram to the inverter through the minimum distance overmodulation control.

In particular, the minimum distance overmodulation control may be performed to cause the voltage applied to the inverter to generate a 6-step wave to a square wave, and as illustrated in the voltage vector diagram of FIG. 4, and may include a process of calculating a virtual vector value obtained by multiplying a voltage vector that corresponds to an inscribed circle of the hexagon of the voltage vector diagram indicating 100% of the inverter voltage use rate by a constant, and a process of virtually drawing a vertical line converged to the vertex of the hexagon indicating 110% or greater of the inverter voltage use rate from the virtual vector value.

Figure 6:
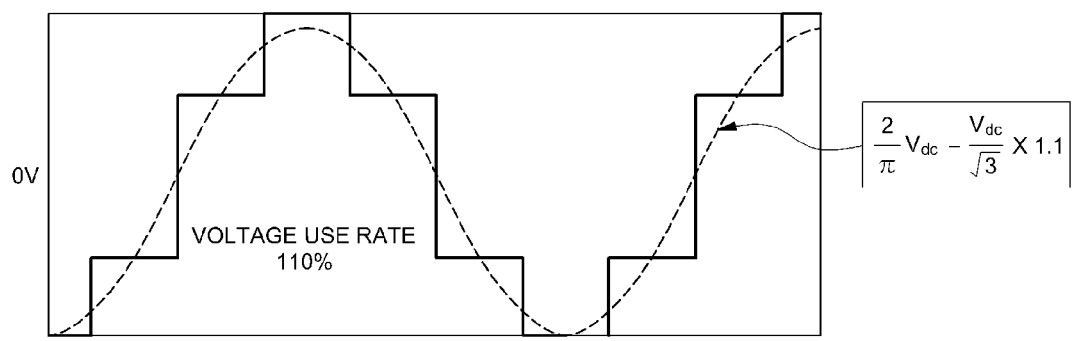
FIG. 6 is an exemplary waveform diagram illustrating a 6-step waveform for 6-step controlling the inverter of the motor driving system according to an exemplary embodiment of the present invention.

Accordingly, the HOVM controller 14, which is the voltage use rate controller, may be configured to apply the voltage command that corresponds to each of the vertexes of the hexagon of the voltage vector diagram to the inverter 17 as the PWM signal, to apply the 6-step voltage from the inverter 17 to the driving motor 18. As described above, the 6-step voltage may be applied to the driving motor by the inverter 6-step control method, to maximally use the voltage use rate (e.g., about 110%) applicable to the driving motor as illustrated in FIG. 6.

In other words, the 6-step voltage may be applied to the driving motor by using 110%

$$\left(\frac{V_{dc}}{\sqrt{3}} \times 1.1\right)$$

or greater of the voltage use rate that corresponds to each of the vertexes of the hexagon as the 100%

$$\left(\frac{V_{dc}}{\sqrt{3}}\right)$$

of the inverter voltage use rate corresponding to the inscribed circle of the hexagon of the voltage vector diagram, to improve output and efficiency of the motor, and reduce a current consumed by the motor under the same output condition, thereby promoting improvement in fuel efficiency of an environmentally-friendly vehicle.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A device for 6-step controlling an inverter of a motor driving system, comprising:
    a current controller that is connected to a current sensor disposed at an output side of an inverter and a current command map and is configured to generate a voltage command using a difference component between a d/q axis current requested by the current command map and a d/q axis current actually measured by a current sensor disposed at the output side of the inverter; and
    an inverter 6-step controller disposed at an input side of the inverter;
    wherein the inverter 6-step controller includes:
        a frequency updating unit including a 12-sample phase control switching frequency calculating unit for calculating a switching frequency component for 12-sample phase control by using voltage vector phase obtained through the voltage vector phase detecting unit;
        a current control task unit including a voltage vector phase detecting unit, which detects a voltage vector phase by using a voltage command output from the current controller and provides the 12-sample phase control switching frequency calculating units with the detected voltage vector phase; and
        a high gain over voltage modulation (HOVM) controller, which generates a high gain over voltage modulated output voltage (VdqssHOVM) by multiplying an output voltage (VdqssRef) of the current controller by a gain, generates the high gain over voltage modulated output voltage (VdqssHOVM) by 12 times per one period of a fundamental wave based on switching frequencies for the 12-sample phase control, adjusts a voltage vector phase by changing a pulse width modulation (PWM) period so that voltage vectors are symmetric based on vertexes so as to converge actual voltage vector to the vertexes of a hexagon of a voltage vector diagram, and applies a voltage command corresponding to the vertexes of a hexagon of a voltage vector diagram to the inverter through minimum distance overmodulation control.

2. The device of claim 1, wherein the inverter 6-step controller is configured to switch one of the switching frequencies for the calculated 12-sample phase control or predetermined switching frequencies to an updated frequency signal.

3. A method of 6-step controlling an inverter of a motor driving system, comprising:
    generating, by a current controller, a voltage command using a difference component between a d/q axis current requested by a current command map and an actually measured d/q axis current by a current sensor disposed at an output side of an inverter;
    detecting, by a voltage vector phase detecting unit, a voltage vector phase from the voltage command; and
    6-step controlling an inverter by generating, by an inverter 6-step controller, switching frequencies for 12-sample phase control using the detected voltage vector phase component, and applying a voltage command that corresponds to each of vertexes of a hexagon of a voltage vector diagram corresponding to a maximum voltage use rate using the generated frequencies to the inverter;
    wherein the 6-step controlling of the inverter includes:
    when the voltage command that corresponds to each of the vertexes of the hexagon of the voltage vector diagram is applied to the inverter, generating, by a high gain over voltage modulation(HOVM) controller of the inverter 6-step controller, a high gain over voltage modulated output voltage by multiplying an output voltage of a current controller by a gain;
    generating, by the high gain over voltage modulation (HOVM) controller, the high gain over voltage modulated output voltage by 12 times per one period of a fundamental wave based on the switching frequencies for the 12-sample phase control;
    changing, by the high gain over voltage modulation (HOVM) controller, a pulse width modulation (PWM) period to cause voltage vectors to be symmetric based on the vertexes to converge the actual voltage vector to the vertex of the hexagon of the voltage vector diagram, and adjusting a voltage vector phase; and
    applying, by the high gain over voltage modulation (HOVM) controller, a voltage command that corresponds to the vertex of the hexagon of the voltage vector diagram to the inverter through minimum distance overmodulation control.

4. The method of claim 3, wherein the minimum distance overmodulation control is performed to cause the voltage applied to the inverter to generate a waveform with the 6 steps to a square wave, and includes:
    calculating, by the high gain over voltage modulation (HOVM) controller, a virtual vector value obtained by multiplying a voltage vector that corresponds to an inscribed circle of the hexagon of the voltage vector diagram indicating 100% of an inverter voltage use rate by a constant; and
    virtually drawing a vertical line converged to the vertex of the hexagon indicating 110% or greater of the inverter voltage use rate from the virtual vector value.

5. The method of claim 3, wherein the 6-step controlling of the inverter further includes:
    generating, by the inverter 6-step controller, the switching frequencies for the 12-sample phase control; and
    determining, by the inverter 6-step controller, whether to perform the 6-step control of the inverter based on whether the switching frequencies satisfy a 12-sample phase control condition.

6. The method of claim 5, wherein the 12-sample phase control condition is set based on a speed and a torque of a motor, and an input voltage of the inverter.

7. The method of claim 5, wherein when the 12-sample phase control condition is not satisfied, a PWM signal, which is a final output voltage signal for the inverter, is synchronized to a predetermined switching frequency to be used for the control of the inverter.

8. The method of claim 5, wherein when the 12-sample phase control condition is satisfied, a PWM signal, which is a final output voltage signal for the inverter, is synchronized to the switching frequencies for the 12-sample phase control to be used for the control of the inverter.

\* \* \* \* \*